United States Patent [19]

Kamenster

[11] Patent Number: 4,831,883
[45] Date of Patent: May 23, 1989

[54] DOUBLE BLUFF BODY VORTEX METER

[75] Inventor: Boris A. Kamenster, Fountain Valley, Calif.

[73] Assignee: ITT Corporation, New York, N.Y.

[21] Appl. No.: 197,774

[22] Filed: May 23, 1988

[51] Int. Cl.$^4$ .............................................. G01F 1/32
[52] U.S. Cl. .................................................. 73/861.22
[58] Field of Search ............ 73/861.22, 861.23, 861.24

[56] References Cited

U.S. PATENT DOCUMENTS 4,171,643  10/1979  Frick .................................. 73/861.24
4,186,599   2/1980  Frick .................................. 73/861.24

FOREIGN PATENT DOCUMENTS 0132866  7/1977  Japan .

Primary Examiner—Herbert Goldstein
Attorney, Agent, or Firm—Menotti J. Lombardi

[57] ABSTRACT

A vortex flow meter for increasing the frequency of vortex shedding to improve the sensitivity of the meter in which the meter body includes a plurality, preferably two, bluff bodies positioned perpendicular to the fluid flow in the meter body. Each such bluff body has an associated sensor downstream of the flow. The spacing between the bluff bodies and between each of the outer bluff bodies and the wall of the meter body is optimized to cause the strongest vortex generation.

2 Claims, 1 Drawing Sheet

DOUBLE BLUFF BODY VORTEX METER

BACKGROUND OF THE INVENTION

1. Field of the Invention

This invention relates to vortex flow meters and more particularly to an improved vortex meter for increasing the frequency of vortex shedding.

2. Description of the Prior Art

In the prior art in general a single bluff body is used upstream in the fluid flow of a sensor such as disclosed in U.S. Pat. No. 4,226,117, Herzl in which the sensor incidentally includes two parallel beams 12(a) and 12(b). Another Herzl U.S. Pat. No., 4,297,898 discloses a bluff body 11 and two parallel beams 13 and 14 downstream thereof on the front faces of which sensors are mounted.

U.S. Pat. No. 4,350,047, Dewey, Jr., et al. discloses two bluff bodies 14 and 16 positioned one behind the other in the direction of fluid flow with a sensor positioned in any location provided it or they sense the Karman vortices generated by coaction of the two cross members. The sensor can advantageously be located on or in the second cross member. It is noted that a single sensor is employed.

Colton U.S. Pat. No. 3,903,742 also employs two bluff bodies 17 and 19, one positioned downstream from the other, with the sensor in between, employed for measuring bidirectional flow such as the flow of air in and out of a person's lungs.

Japanese Patent No. 55-89756 Jul. 7, 1980 also discloses a pair of bluff bodies 2 and 3 employed for bidirectional measurement but incorporates two sensors 8 and 9 which also detect the direction of flow.

U.S. Pat. No. 3,564,915, Tomota, et al. in FIG. 21(a) also discloses two bluff bodies, one downstream from the other to provide a bidirectional vortex meter with a pair of separate sensors mounted on a pair of separate bluff bodies.

U.S. Pat. No. 3,927,566, Zanker, also shows in FIG. 7 two bluff bodies one downstream from the other for producing a flow switching in the gap therebetween. The sensors may be one or more heat loss detectors located on one or both of the bluff bodies. FIG. 8(a) shows two vortex members 111 and 112 connected by a member 115. Fluid flow is only in one direction and only the member 111 is connected to the wall of the conduit 114.

U.S. Pat. No. 4,485,679, Pitt et al., also discloses co-linearly disposed bluff bodies 12 and 13 which interact with the fluid stream to generate vortices. Two detectors 14 and 15 are employed, one downstream of each of the bluff bodies and only unidirectional flow is disclosed.

The shortcoming of the prior art is that in the design of a large size vortex meter with a single bluff body installed in the middle the meter has low resolution which fact limits the application of vortex meters. The frequency is proportional to the flow velocity. The higher the frequency of vortex shedding, the smaller amount of gallons per pulse and accordingly, the higher the accuracy of the meter. When you use a large meter the frequency is small and so it is harder to get an accurate measure.

In accordance with an aspect of the present invention, it is an object to provide a new and improved vortex flow meter employing higher frequency of vortex shedding.

Another object is to provide a vortex fluid flow meter having a plurality of bluff bodies positioned perpendicular to the fluid flow optimized to cause the strongest vortex generation and to increase the frequency of vortex generation.

SUMMARY OF THE INVENTION

The foregoing and other objects are accomplished by providing a vortex fluid flow meter including a meter body having a plurality, preferably two, of bluff bodies positioned perpendicular to the fluid flow in the same meter body. Each bluff body has an associated sensor downstream. The spacing between the bluff bodies and between each of the outer bluff bodies and the wall of the meter is optimized to cause the strongest vortex generation. The frequency of vortex shedding is a multiple of the number of bluff bodies.

Other objects, features and advantages of the invention will become apparent from a reading of the specification when taken in conjunction with the drawings in which like reference numerals refer to like elements in the two views.

DESCRIPTION OF THE PREFERRED EMBODIMENT

Figure 1:
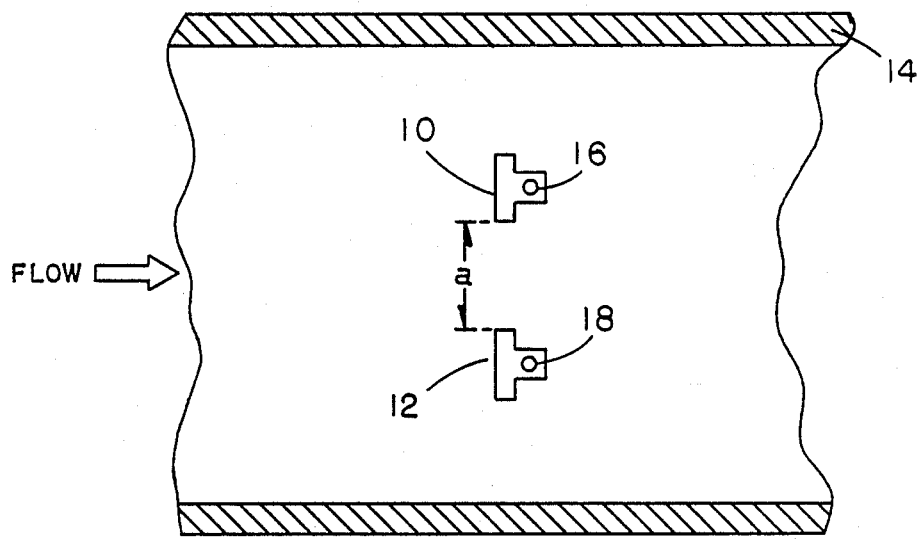
FIG. 1 is a cross-section of the meter body taken in the direction of fluid flow.

In the preferred embodiment the vortex meter has two parallel bluff bodies 10 and 12 as illustrated in FIG. 1 Each of these bluff bodies works independently. Each has a width of one half of the single bluff body appropriate to the particular size of the pipe. This can be done because of the length of the double bluff body is also smaller in the direction of fluid flow. Because each bluff body works independently the probability that both of them will simultaneously detect missing pulses is also very small and hence total accuracy is increased.

Figure 2:
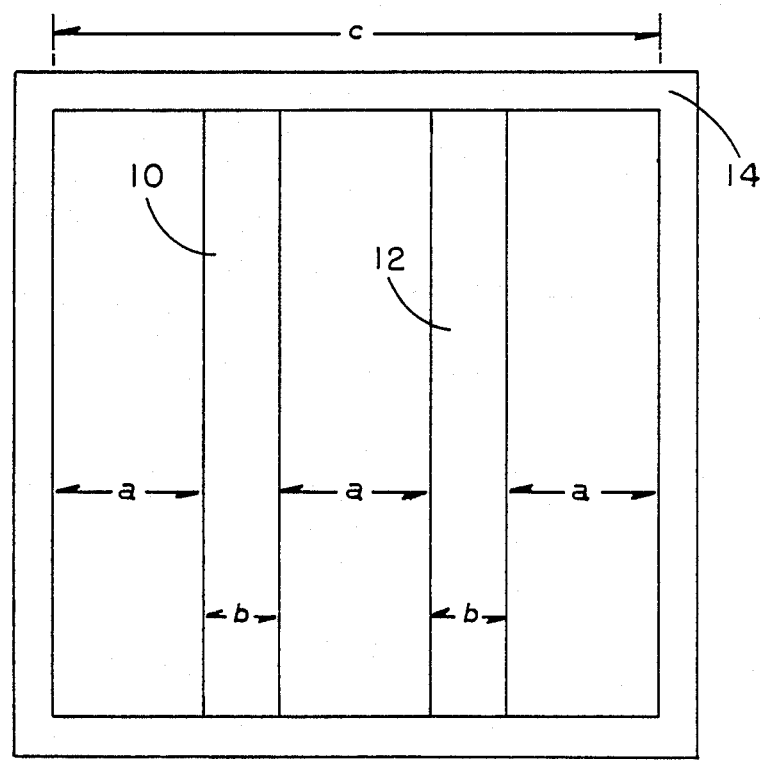
FIG. 2 is a cross-section of the meter body taken in the direction perpendicular to fluid flow to illustrate the spacing of the bluff bodies and the meter body.

The spacing between the bluff bodies is illustrated in FIG. 2 to be a whereas the width of the bluff bodies 10 and 12 is b. The meter body pipe 14 is square. In the design of a vortex meter including a single bluff body the dimensions of the bluff body are optimized such that $b \times 3.75 = c$ the width of the pipe 14. In the double bluff body design, the appropriate dimensions are $2b \times 3.75 = c$. Each of the bluff bodies 10 and 12 has a sensor 16 and 18 respectively mounted downstream thereon for detecting vortex shedding from its respective body. When positioned correctly there will be no interaction between the vortices from one bluff body and the sensor of the other as though effectively there were a wall down the middle of the pipe in the direction of fluid flow between the two bluff bodies 10 and 12. In testing it was shown that if the bluff bodies are located adjacent to each other then the performance is as if one bluff body with double width is installed. If the bluff bodies are moved apart but the distance between them is not sufficient then no vortices will be generated. If they are moved too close to the walls of the pipe, no signal can be detected. If the bluff bodies have sufficient distances from each other and from the wall then very clear and strong signals are detected from each.

While a particular embodiment of the invention has been described, it will be understood of course, that it is not intended to limit the invention thereto since many modifications may be made. For example, more than two bluff bodies could be employed. However, the preferred embodiment employs two. It is therefore contemplated by the appended claims to cover any such modifications as fall within the true spirit and scope of the invention.

What is claimed as new and desired to be secured by Letters Patent of the United States is:

1. A vortex fluid flow meter including a meter body having a pair of bluff bodies positioned perpendicular to the fluid flow in said meter body, each bluff body having an associated sensor downstream thereof, the spacing between said bluff bodies and between each of the pair of bluff bodies and the wall of the meter body being optimized to cause strongest vortex generation, such that the spaces between the walls of the meter body and the bluff bodies, and the space between the two bluff bodies are equal.

2. In a vortex fluid flow meter, a double bluff body design comprising in combination:

a square meter body having an internal width C;

a pair of bluff bodies positioned in said meter body perpendicular to the fluid flow in said meter body, and the width of each of said bluff bodies being b; and each of said bluff bodies having an associated sensor downstream of the fluid flow for detecting vortex shedding from its respective body, and said double bluff body design being such that the dimensions are 2b times 3.75 equals C.

* * * * *